F254A XR 3,454,768
307/425

INVENTOR
R. KOMPFNER
BY Sylvan Sherman
ATTORNEY

United States Patent Office 3,454,768

Patented July 8, 1969

3,454,768

INTRACAVITY IMAGE CONVERTER

Rudolf Kompfner, Middletown, N.J., assignor to Bell Telephone Laboratories, Incorporated, Murray Hill, N.J., a corporation of New York Filed Sept. 23, 1966, Ser. No. 581,565

Int. Cl. H01j *31/50;* G01t *1/16;* H01s *3/00*

U.S. Cl. 250—83.3 3 Claims

ABSTRACT OF THE DISCLOSURE

An infrared image converter which utilizes an infrared absorbing material disposed within the oscillator cavity of an optical maser to produce a pattern of heat-induced density fluctuations in an adjacent gas and a Schlieren optical system to create a corresponding visible image.

Figure 1:
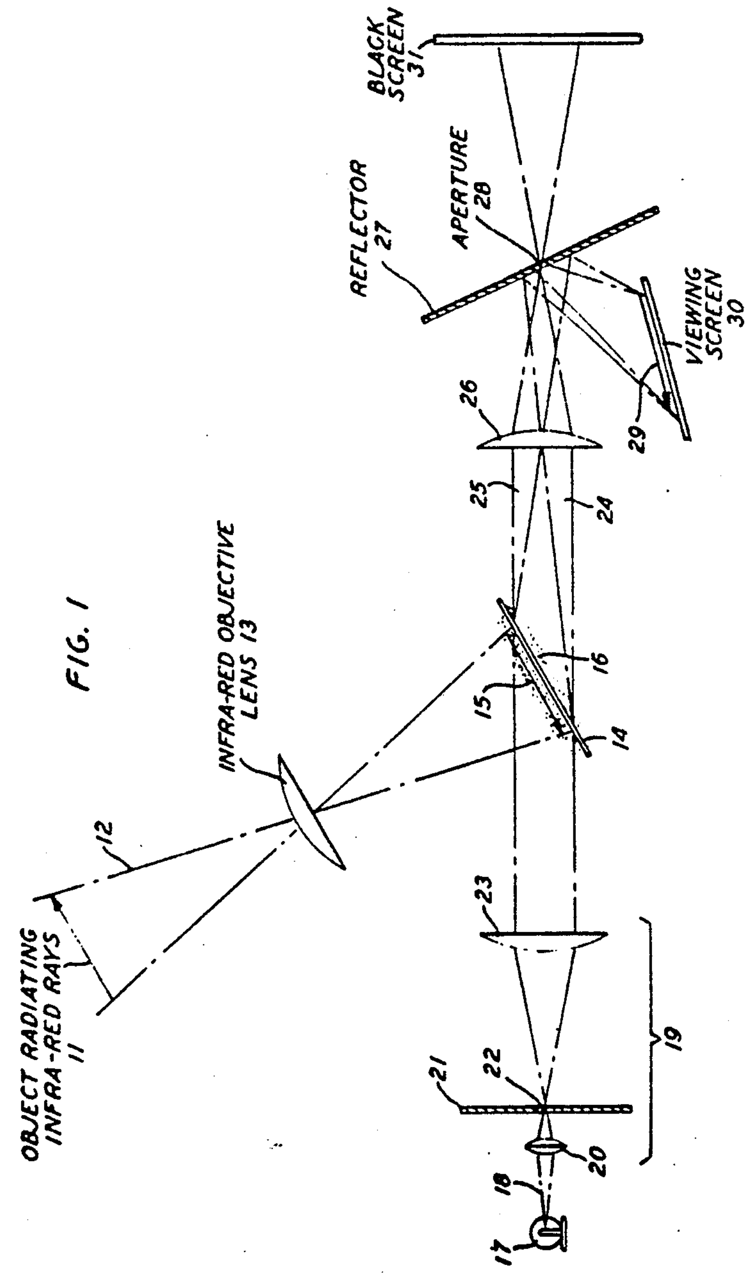

This invention relates to image converters which utilize an absorbing material as a radiation sensing element.

Image converters, various kinds of detectors, and photographic techniques constitute the three general classes of devices used to permit human interpretation of invisible radiation. Image converters differ from detectors in that converters display the entire pattern of the image while detectors merely give the intensity of the radiation striking the detector surface. (In order to utilize detectors to recreate an image it is necessary to place them in an array, or to devise some sort of scanning device.) Image converters differ from photographic techniques in that converters effect a direct conversion of the image, whereas photographic techniques generally require separate exposures and, in addition, some intermediate process—usually chemical—to develop the exposures.

One difficulty with conventional image converters is the problem of obtaining radiation sensing elements which respond to radiation throughout a broad spectral region. For example, in the infrared spectral region (which includes wavelengths from 0.76 of a micron to several thousand microns), the conventional electron tube converter does not respond to radiation with wavelengths much longer than 1.3 microns. This is because the sensing element of the tube converter is a photo-emitting material, and it is difficult to process materials that will emit electrons at lower frequencies. Cf. Smith, Detectors for Ultraviolet, Visible and Infrared Light, 4:631 (1965), at p. 632.

There are, however, many materials which thermally absorb radiation over a relatively wide spectral range. An image converter utilizing a simple absorbing material as a sensing element is thus responsive over a wider range. With respect to the infrared region, it is known that there are materials whose absorbance is approximately uniform throughout the infrared region and into the short radio wave region. (Cf. Jamieson et al., Infrared Physics and Engineering (1963) at p. 129.)

While simple absorbing membranes have been used as radiation detectors, see Golay, a Pheumatic Infrared Detector, Rev. Sci. Instr., 18:357, the more difficult problem of utilizing absorbing materials as sensing elements in image converters, as opposed to detectors, does not appear to have been heretofore solved in a satisfactory manner.

In an image converter according to the present invention the invisible image is focused on an absorbing material. The corresponding pattern of heat-induced density fluctuations produced in a gas adjacent to the absorbing material is then used to create a corresponding visible image by disturbing a beam of light passed through the pattern.

Two illustrative embodiments of the invention are described in detail below. In the first of the two embodiments the absorbing material is used in conjunction with a typical "Schlieren" optical system. In the second the absorbing material and the Schlieren system are placed within the oscillator cavity of an optical maser.

Figure 2:
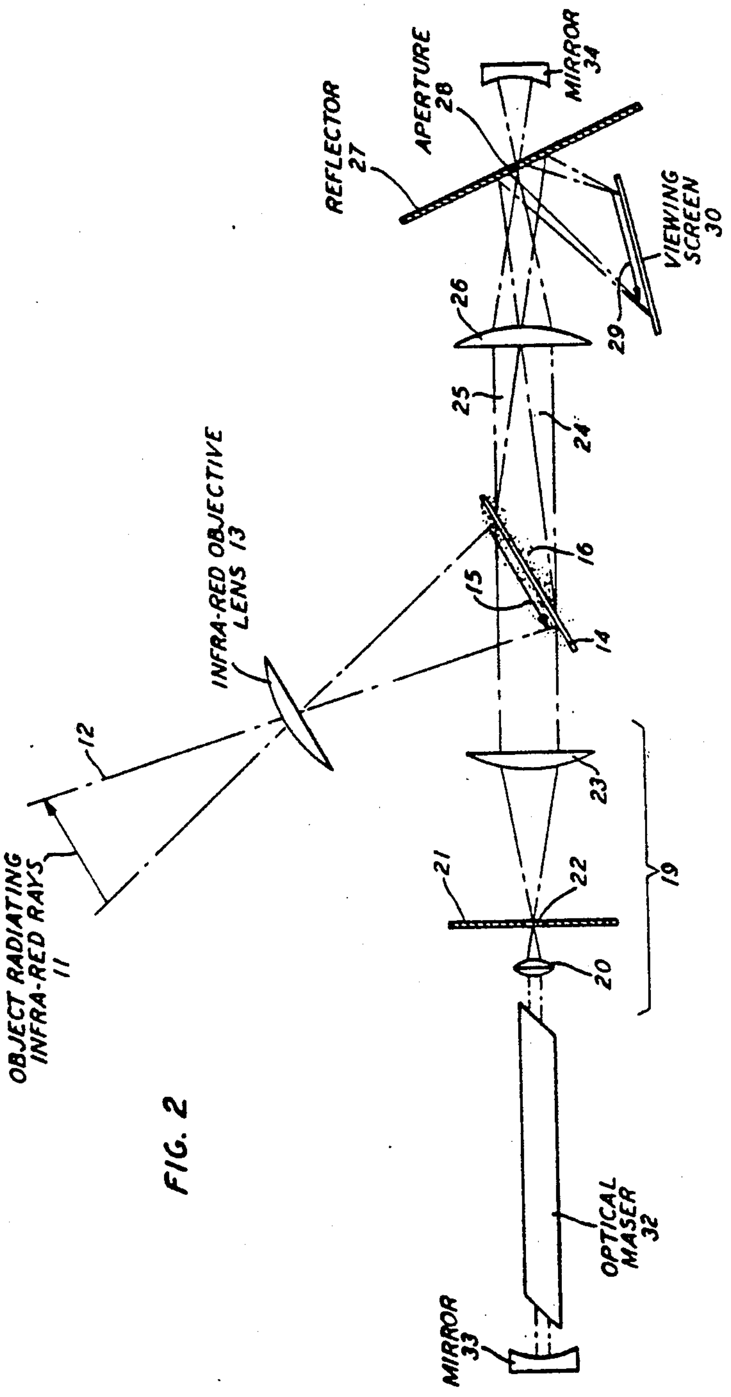

The invention may now be described in greater detail by reference to the accompanying drawings wherein:

FIG. 1 is a schematic illustration of a typical image converter for the infrared region in accordance with the invention utilizing a typical Schlieren optical system; and FIG. 2 is a schematic illustration of an advantageous alternative embodiment of the invention in which the absorbing material and the Schlieren system are placed within the oscillator cavity of an optical maser.

In FIG. 1 there is shown an optical system termed a Schlieren system, which is used in this first illustrative embodiment of the invention, an infrared-emitting object 11, an infrared objective lens 13, a membrane 14 of a material such as Mylar, which absorbs infrared radiation but transmits visible light, and a gas 16 adjacent to membrane 14. Other than the requirement that the gas be transparent to both the visible and infrared radiation, neither the composition nor the pressure of the gas is critical to the operation of the invention. Thus, for simplicity, air at atmospheric pressure can be used. However, to avoid disturbing the gas, means (not shown) are advantageously provided for enclosing the apparatus.

The so-called Schlieren system shown comprises a visible light source 17, a collimating means 19, a focusing means 26, an apertured reflector 27 having an aperture 28 placed one focal length from focusing means 26, a black screen 31, and a display screen 30. The collimating means 19 typically comprises a focusing lens 20, an apertured screen 21 having an aperture 22 one focal length from lens 20, and a collimating lens 23.

The light source 17 is preferably, though not necessarily, an optical maser since masers can be focused through smaller apertures than ordinary lamps, and they thus yield greater sensitivity.

In operation, the apparatus focuses on the screen 30 a visible image 29 of the infrared image 15 focused on membrane 14. Infrared radiation, represented by rays 12 emitted from object 11, is focused by the infrared objective lens 13 onto the absorbing membrane 14 to form an infrared image 15 of object 11. The image 15 heats the membrane 14 in a corresponding pattern which, in turn heats the adjacent gas, forming therein a corresponding pattern density fluctuation.

It is the function of the Schlieren system 10 to display a visible image 29 of the object 11 on the screen 30. This it does in the following manner. The light source 17 emits a beam 18 which is collimated by collimating means 19, and passed through the pattern of gas density fluctuations and membrane 14. Since gas adjacent to areas of the membrane upon which no portion of the infrared image 15 is focused is heated only indirectly, it has substantially the same density as gas elsewhere along the visible beam 18. Light passing through these areas is substantially unaffected and is focused by lens 26 so as to pass through the aperture 28. It is then absorbed by the black screen 31. On the other hand the gas adjacent to areas of membrane 14 upon which portions of the infrared image 15 are focused is heated. As a consequence, the gas density adjacent to those portions is substantially reduced, and that portion of the light passing through those areas is perturbed. Each point where the gas density is reduced by contact with a heated portion of membrane 14 can be considered to be a point source of light. Beams 24 and 25 are representative of light emitted from two such points along the infrared image. In general, all the perturbed light is focused by lens 26 and reflected by the tilted reflector 27 onto an appropriately placed viewing screen 30 to form the visible image 29 of the pattern of gas density fluctuations 16. Thus, each incremental area of the infrared image 15 is mapped into a corresponding incremental area of the visible image 29.

FIG. 2 illustrates an advantageous alternative embodiment of the invention which, instead of utilizing an external light source 17 of FIG. 1, utilizes the light within an optical maser oscillating cavity. The chief difference between the structure of this embodiment and that of the embodiment illustrated in FIG. 1 is that here the external light source 17 of FIG. 1 is replaced by an optical maser oscillating system, and the black screen 31 of FIG. 1 is replaced by a concave mirror 34. It should be noted, however, that this is not simply a case of using an optical maser as an external light source. Rather, the optical system and the membrane, in particular, are placed within the maser cavity.

Referring to FIG. 2, the optical maser comprises a maser active medium 32, such as helium-neon, active in the visible region of the spectrum, and concave mirrors 33 and 34, suitably positioned and suitably coated so as to constitute an optical resonant cavity for maser oscillation in the visible region. All other components are identified by the same identification numerals that were used in FIG. 1.

In operation, the apertured reflector 27 is placed so that the unperturbed, focused parallel beam passes through the aperture 28 and is reflected back by the concave mirror 34, thus remaining within the resonating system. The perturbed light, on the other hand, is reflected out of the cavity by reflector 27.

The advantage of placing the membrane within the optical maser oscillator cavity is greater image brightness or greater sensitivity for the same brightness. This advantage may be demonstrated by comparing the power coupled out of the system into the visible image where the membrane is within the maser cavity with the power coupled out where the membrane is outside the maser cavity.

If $W_0$ represents the power inside a maser cavity, $t$ the transmission of the system, $G$ the total gain of the maser active medium, and $a$ the total loss of the system, then the power, $P$, coupled out of the system with the membrane in the maser cavity is given by the relation:

$$P=W_0 t\left[\frac{G}{a+t}-1\right] \qquad (1)$$

It can be shown that the maximum power $W_{max.}$ which can be coupled out of the system where the membrane is outside the maser cavity is given by $$W_{max.}=W_0 t(\sqrt{G}-\sqrt{a})^2 \qquad (2)$$

The gain in sensitivity of the system obtained by placing the membrane in the maser cavity, $P/W_{max.}$, is thus given by $$\frac{P}{W_{max.}}=\frac{\left(\frac{G}{a+t}-1\right)}{(\sqrt{G}-\sqrt{a})^2} \qquad (3)$$

Since in practice $t \gg a$, the gain in sensitivity may be approximated by the expression, $$\frac{P}{W_{max.}}\approx\frac{1}{a}\,\frac{\sqrt{G}+\sqrt{a}}{\sqrt{G}-\sqrt{a}} \qquad (4)$$

Since in normal operation $G \approx a$ and $1 \gg a$, it can be readily seen that the gain in sensitivity is much greater than one. In fact, for typical values of the parameters it is about two orders of magnitude.

While the invention has been described with particular reference to the specific embodiments illustrated in FIGS. 1 and 2, it is to be understood that these are merely representative of the many embodiments which may be devised without departing from the spirit and scope of the invention. For example, both of the specific embodiments shown have been described as infrared image converters. However, the spectral range over which these devices can act as image converters is limited only by the spectral range over which the membrane absorbs radiation. Thus, with an appropriate objective focusing lens and an appropriate membrane, low frequency radio radiation, or ultra-violet radiation images can be converted to visible light images. Also, while a Schlieren optical system was used in both examples, the kind of Schlieren system shown is not exhaustive of the kinds of systems which can be used with the present invention, nor is it meant to be implied that only a Schlieren system can be used as the means for coupling out that portion of the visible light beam which has been disturbed by density fluctuations in the gas.

What is claimed is:

1. An image converter comprising:
an optical maser including an oscillator cavity;
a radiation absorbing material disposed within said cavity;
means for focusing a radiation image on said absorbing material;
a gas in thermal contact with said absorbing material;
and means for coupling out of said laser cavity that portion of laser light which has been perturbed by density fluctuations in the gas adjacent to said absorbing material.

2. Apparatus according to claim 1 wherein the coupling-out means comprises a Schlieren optical system.

3. Apparatus according to claim 1 wherein said gas is air at ambient atmospheric pressure.

References Cited

UNITED STATES PATENTS

| | | | |
|---|---|---|---|
| 2,824,235 | 2/1958 | Hahn, et al. | |
| 2,959,678 | 11/1960 | Jones | 250—83 |
| 3,141,974 | 7/1964 | Anphan. | |
| 3,153,724 | 10/1964 | Demorest. | |
| 3,281,712 | 10/1966 | Koester | 331—94.5 |
| 3,292,103 | 12/1966 | Soules et al. | |
| 3,293,565 | 12/1966 | Hardy | 331—94.5 |
| 3,355,588 | 11/1967 | Acloque | 250—71 |
| 3,366,792 | 1/1968 | Ohm | 331—94.5 X |

ARCHIE R. BORCHELT, *Primary Examiner.*

SAUL ELBAUM, *Assistant Examiner.*

U.S. Cl. X.R.

250—213; 331—94.5; 350—161; 356—51